United States Patent
Gibson, II et al.

(10) Patent No.: US 11,014,858 B2
(45) Date of Patent: May 25, 2021

(54) MINERAL GRINDING

(71) Applicant: GCP Applied Technologies Inc., Cambridge, MA (US)

(72) Inventors: Larry R. Gibson, II, Coppell, TX (US); Byong-Wa Chun, Honolulu, HI (US); Josephine Cheung, Lexington, MA (US); Leslie A J. Buzzell, Burlington, MA (US)

( * ) Notice: Subject to any disclaimer, the term of this patent is extended or adjusted under 35 U.S.C. 154(b) by 326 days.

(21) Appl. No.: 16/089,816

(22) PCT Filed: Mar. 28, 2017

(86) PCT No.: PCT/US2017/024556
§ 371 (c)(1),
(2) Date: Sep. 28, 2018

(87) PCT Pub. No.: WO2017/172780
PCT Pub. Date: Oct. 5, 2017

(65) Prior Publication Data
US 2019/0119170 A1    Apr. 25, 2019

Related U.S. Application Data

(60) Provisional application No. 62/315,229, filed on Mar. 30, 2016, provisional application No. 62/315,213, filed on Mar. 30, 2016.

(30) Foreign Application Priority Data

Nov. 1, 2016    (EP) ..................................... 16196739

(51) Int. Cl.
| C04B 14/28 | (2006.01) |
| B02C 23/06 | (2006.01) |
| C04B 28/12 | (2006.01) |
| C04B 103/52 | (2006.01) |
| C04B 40/00 | (2006.01) |
| C04B 20/02 | (2006.01) |

(52) U.S. Cl.
CPC .......... C04B 40/0039 (2013.01); B02C 23/06 (2013.01); C04B 14/28 (2013.01); C04B 20/026 (2013.01); C04B 28/12 (2013.01); C04B 2103/52 (2013.01)

(58) Field of Classification Search
CPC . C04B 40/0039; C04B 2103/52; B02C 23/06; C09K 3/22
USPC ......................................................... 241/16
See application file for complete search history.

(56) References Cited

U.S. PATENT DOCUMENTS

| 3,325,105 | A  | 6/1967  | Veltman |
| 7,297,205 | B2 | 11/2007 | Michl et al. |
| 7,615,587 | B2 | 11/2009 | Qiu et al. |
| 7,922,811 | B2 * | 4/2011 | Jardine ..................... C04B 7/52 |
| | | | 106/823 |
| 8,074,909 | B2 | 12/2011 | Gane et al. |
| 8,445,579 | B2 | 5/2013 | Suau et al. |
| 8,841,374 | B2 | 9/2014 | Guerret et al. |
| 8,845,804 | B2 | 9/2014 | Buri et al. |
| 8,979,998 | B2 * | 3/2015 | Jardine ................... C04B 16/00 |
| | | | 106/757 |
| 9,133,057 | B2 | 9/2015 | Marazzani et al. |
| 2005/0166801 | A1 | 8/2005 | Jardine et al. |
| 2005/0234176 | A1 | 10/2005 | Mongoin et al. |
| 2007/0107638 | A1 * | 5/2007 | Chun ....................... C04B 28/02 |
| | | | 106/729 |
| 2009/0209692 | A1 | 8/2009 | Suau et al. |
| 2011/0021667 | A1 * | 1/2011 | Hamai ..................... C04B 28/02 |
| | | | 524/3 |
| 2011/0133006 | A1 | 6/2011 | Guillot et al. |
| 2012/0142842 | A1 | 6/2012 | Jacquemet et al. |
| 2013/0202758 | A1 * | 8/2013 | Brown ................. A62D 1/0014 |
| | | | 426/496 |
| 2014/0299022 | A1 * | 10/2014 | Honert .................... C04B 28/02 |
| | | | 106/505 |

(Continued)

FOREIGN PATENT DOCUMENTS

| CN | 103043939 | 4/2013 |
| CN | 105669910 | 6/2016 |

(Continued)

OTHER PUBLICATIONS

Roesky, European Search Report for EP16196739, dated Jun. 9, 2017, 6 pages.
Roesky, Form PCT/ISA/210, International Search Report for PCT/US2017/024556, dated Jun. 14, 2017, 3 pages.
Roesky, Form PCT/ISA/237, Written Opinion of the International Searching Authority for PCT/US2017/024556, dated Jun. 14, 2017, 6 pages.

*Primary Examiner* — Shelley M Self
*Assistant Examiner* — Smith Oberto Bapthelus
(74) *Attorney, Agent, or Firm* — Craig K. Leon

(57) ABSTRACT

The present invention pertains to the discovery that short chain aliphatic fatty acids, such as potassium sorbate, can be used in liquid-additive grinding compositions in the amount of at least 10%, more preferably at least 20%, and most preferably at least 30%, to mill carbonate materials into smaller particle size. The carbonate material can optionally be combined with another inorganic material in the grinding operation, such as limestone, lime, dolomites, talc, titanium dioxide, alumina, and kaolin, ceramics, and cement clinker. The use of the particularly described grinding additive composition are food-grade or food-contact approved, and are believed by the present inventors to resist the humectant behavior of the resultant ground particles which could in herently otherwise decrease efficiency of the particulate grinding process.

14 Claims, No Drawings

(56) References Cited

U.S. PATENT DOCUMENTS

| | | | |
|---|---|---|---|
| 2014/0345496 A1 | 11/2014 | Dufour | |
| 2015/0166412 A1 | 6/2015 | Stefan et al. | |
| 2016/0068437 A1 | 3/2016 | Jardine et al. | |
| 2019/0119170 A1* | 4/2019 | Gibson, II | ............. C04B 14/28 |

FOREIGN PATENT DOCUMENTS

| | | | |
|---|---|---|---|
| EP | 1728771 | 6/2006 | |
| EP | 1728771 A2 * | 6/2006 | ............. C04B 24/02 |
| EP | 2660217 | 11/2013 | |
| EP | 2692241 | 2/2014 | |
| EP | 2692241 A1 * | 2/2014 | ........... A23L 29/015 |
| WO | 2007109328 | 9/2007 | |
| WO | 2010063757 | 6/2010 | |
| WO | 2013066794 | 5/2013 | |
| WO | 2013095961 | 7/2013 | |
| WO | 2014003972 | 1/2014 | |
| WO | 2014019827 | 2/2014 | |

* cited by examiner

MINERAL GRINDING

FIELD OF THE INVENTION

This invention relates to additives for refinement of minerals, and more specifically to the use of an aliphatic fatty acid compound for grinding carbonate material into finer particle size using a food-grade grinding process which minimizes water-uptake by the ground particles.

BACKGROUND OF THE INVENTION

As calcium carbonate, alternatively referred to herein as limestone ($CaCO_3$), is useful as a filler in food, pharmaceutical, and heath care products (e.g., toothpaste), it is known to employ various grinding additives for enhancing the efficiency of the grinding process through which the carbonate material is ground into smaller particle sizes. Such efficiency enhancement is understood to occur when the energy required for grinding the material to a certain particle size is reduced.

It is known to grind inorganic solids such as cement and limestone using glycerol compounds. For example, U.S. Pat. No. 3,615,785 of Moorer et al. disclosed the use of polyglycerols as additives for the manufacture of hydraulic cement.

As another example, U.S. Pat. Nos. 7,922,811 and 8,979,998 of Jardine et al. (owned by the common assignee hereof) disclosed the use of crude glycerin (an alternative name for glycerol), as obtained from biomass sources (such as biodiesel fuel production) in combination with conventional cement additives for grinding cement clinker and/or limestone particles.

WO 2014/019827 of Lopez-Gonzalez et al. (SIKA AG) disclosed the use of food-grade grinding aids for improved grinding of calcium carbonate and hydrated lime. The grinding aid composition taught by Lopez-Gonzalez comprised one or more polyhydric alcohols used in the grinding aid composition in an amount of from about 10%-95% by weight (and most preferably 20%-40% by weight), one or more carboxylic acids in the amount of from about 0.1%-10% by weight (and most preferably 1%-2% by weight), or a mixture of the polyhydric alcohol and carboxylic acid.

However, the present inventors believe that a novel method and grinding composition is required for food-grade, anti-humectant grinding of carbonate (limestone) and lime. The prior art approaches which involve large amounts of glycerol or other polyols could detrimentally affect the resultant finely ground material by introducing moisture-absorbing behavior. This humectant property could decrease bulk material flow/transport and reduce the efficiency of the grinding process.

Hence, a novel method and grinding aid composition for comminuting limestone and lime is sorely needed.

SUMMARY OF THE INVENTION

In surmounting the prior art disadvantages, the present invention provides an effective method which is food-grade approved or otherwise approved for contact with food, and is resistant to the inherent moisture-absorbing ability of ground carbonate or lime which could otherwise diminish efficiency of the grinding operation.

It is believed that use of the liquid grinding additive compositions can increase grinding efficiency in ball mills (which use spheres within a rotating cylinder) as well as in roller mills (which employ rollers on a horizontal table or in opposed nipped configuration) which grind carbonate materials, and can be used where the carbonate materials are ground along with mineral particles including lime, dolomite, talc, titanium dioxide, alumina, kaolin, ceramics, cement clinker, or mixture of these.

Exemplary methods and compositions of the present invention thus involve the use of a liquid-additive grinding aid composition that incorporates at least 10%, more preferably at least 15%, and most preferably at least 20% or 30% by total weight of a short-chain aliphatic fatty acid (e.g., potassium sorbate), and optionally a simple polyol (glycerol), to enhance grinding of minerals using food-grade materials which resists moisture absorption by the resultant ground particles in a manner that might be fairly described as "anti-humectant."

The present inventors observe here that WO 2014/019827 of Lopez-Gonzalez et al., mentioned in the background section, had previously taught the use of potassium sorbate as an antimicrobial agent in a grinding additive composition for dry grinding of carbonate particles. However, Lopez-Gonzalez et al. only taught that antimicrobial (or antifungal, antibacterial) agents could be used, at most, in amounts up to 5% by weight, preferably in an amount from 0.1% to 3% by weight, and most preferably in an amount of 0.5% to 2% by weight. The present inventors discovered that potassium sorbate at higher amounts (e.g., 10%, 20%, etc.) enhanced grinding to a surprisingly appreciable extent (and this is demonstrated in the comparative data set forth by the present inventors in the detailed description of exemplary embodiments which follows).

Thus, an exemplary method of the present invention for comminuting inorganic material to a finer particle size, comprises: grinding a carbonate material into powder particles, in a ball or roller mill, into which is introduced a liquid-additive composition comprising (a) a fatty acid compound in the amount of 10%-60% by weight, the fatty acid compound being represented by the structural formula $CH_3-(CH)_n-COO^-M^+$ wherein M represents an alkali or alkaline earth metal selected from the group consisting of potassium, sodium, and calcium, and n represents an integer of 3 to 10; (b) a glycerin in the amount of 0%-90% by total weight; and (c) water in the amount of 5%-90%, all percentages being based on total weight of the liquid-additive composition introduced to the carbonate powder particles being ground.

The present invention also relates to a liquid additive composition comprising a combination of the above-described fatty acid compound in combination with the glycerin and water in the above-described percentage ranges (by total weight based on the liquid additive composition).

An exemplary liquid grinding additive composition of the present invention for enhancing efficiency of grinding carbonate particles to smaller size, comprises: (a) fatty acid compound in the amount of 10%-60% by weight, the fatty acid compound being represented by the structural formula $CH_3-(CH)_n-COO^-M^+$ wherein M represents an alkali or alkaline earth metal selected from the group consisting of potassium, sodium, and calcium, and n represents an integer of 3 to 10; (b) glycerin in the amount of 0%-90% by total weight; and (c) water in the amount of 5%-90%, all percentages being based on total weight of the liquid-additive composition introduced to the carbonate powder particles being ground.

The present inventors believe that the use of a large amount of the above-described low molecular weight fatty acid compound (at least 10% by weight) enables the preferred inclusion of glycerin and is believed to avoid or minimize the detrimental inherent ability of the glycerin to absorb moisture from the environment which might otherwise work to decrease energy efficiency of a ball mill or roller mill grinding process used for comminuting the carbonate material into smaller particle size.

Further features of the invention will be described in further detail hereinafter.

DETAILED DESCRIPTION OF EXEMPLARY EMBODIMENTS

The term "calcium carbonate" is alternatively known as "limestone" which is composed mainly of calcium carbonate or dolomite, used as a filler and also as a building material and in the making of cement. Methods and additive compositions are intended to be used for dry (powder) grinding of carbonate into finer particulate sizes, and the carbonate material can also be ground with one or more other inorganic materials, such as lime, dolomites, talc, titanium dioxide, alumina, and kaolin, ceramics, and cement clinker.

Methods and compositions of the present invention employ the use of a liquid-additive composition which comprises a fatty acid compound which has 3-10 carbons, more preferably 5-8 carbons, and most preferably 6 carbons. A preferred fatty acid compound is a metal sorbate, preferably potassium sorbate. Sodium and calcium sorbates are also preferred.

Exemplary "liquid-additive compositions" of the present invention are described as a "liquid" form in that they can be sprayed onto the carbonate material to be ground using pressured nozzles and/or pumps. Water is preferably used to liquefy the low molecular weight fatty acid (e.g., potassium sorbate) and render it sprayable or injectable in liquid form into the material to be ground.

Glycerin (e.g., glycerol) may be employed in exemplary embodiments to enhance the ability of the liquid-applied grinding additive composition to coat the carbonate particles during grinding. Glycerin refers to 1,2,3-propane triol. In exemplary embodiments of the invention, the glycerin may be a crude glycerin derived from biomass sources, such as a byproduct of biodiesel production, as taught in U.S. Pat. Nos. 7,922,811 and 8,979,998 of Jardine et al., mentioned in the background section above.

The present inventors believe that the use of low molecular weight (i.e., short chain) fatty acid compounds, such as potassium sorbate, in amounts of at least 10%, more preferably at least 20%, and most preferably at least 30% based on total weight of the liquid-additive cement grinding composition helps to minimize or delimit the inherent moisture-absorbent (or humectant) properties of the resultant ground carbonate particles, thereby helping to enhance the efficiency of the grinding operation.

The grinding aid compositions used in the method of the invention can provide a ground material, wherein the amount of moisture absorbed by the ground material is reduced, compared to ground materials prepared using conventional grinding aids. Typically, the ground inorganic material that results from the method of the invention absorbs less than 1.6 mg/g (mg of water absorbed per gram of ground inorganic material), more preferably less than 1.4 mg/g. Typically, the ground inorganic material that results from the method of the invention absorbs about the same amount of water as ground inorganic material that has been produced in a method wherein no grinding aid composition is used, or absorbs less water, e.g. not greater than 150 wt.-% of the amount of water absorbed by ground inorganic material produced without a grinding aid, preferably not greater than 105 wt.-% and most preferably around 100 wt.-% or less.

The term "fatty acid" will also be understood by those versed in the chemical arts to refer also to the salt form; and, conversely, the terms potassium sorbate, sodium, sorbate, and calcium sorbate will be understood to refer to sorbic acid within the aqueous environment of the liquid-additive composition of the present invention. To this point, such acid/salt materials have been used as antimicrobial agents, most often as food preservatives, but not as grinding-additives.

As summarized above, an exemplary method of the present invention for comminuting inorganic material to a finer particle size, comprises: grinding a carbonate material into powder particles, in a ball or roller mill, into which is introduced a liquid-additive composition comprising (a) a fatty acid compound in the amount of 10%-60% (more preferably at least 20%-60%, and most preferably at least 30%-55%) by weight, the fatty acid compound being represented by the structural formula $CH_3-(CH)_n-COO^-M^+$ wherein M represents an alkali or alkaline earth metal selected from the group consisting of potassium, sodium, and calcium, and n represents an integer of 3 to 10 (more preferably n is 4-8, and most preferably n is 4); (b) a glycerin in the amount of 0%-90% by total weight; and (c) water in the amount of 5%-90%, all percentages being based on total weight of the liquid-additive composition introduced to the carbonate powder particles being ground.

In further exemplary methods of the invention, the fatty acid compound is most preferably potassium sorbate. In further exemplary methods, the fatty acid compound may alternatively be sodium sorbate, calcium sorbate, or mixture thereof. In still further exemplary methods, the liquid additive composition may comprise at least two, or all three, of the foregoing sorbate compounds. Thus, other exemplary liquid additive compositions may include potassium sorbate and sodium or calcium sorbate.

As calcium sorbate and sodium sorbate are less soluble compared to potassium sorbate, liquid additive compositions which comprise either of these sorbates may additionally and preferably comprise at least one viscosity modifying agent (VMAs) for helping to suspend calcium sorbate particles and/or sodium sorbate particles. Exemplary VMAs may include, for example, (a) biopolymer polysaccharides selected from the group consisting of diutan, welan gum, xanthan, rhamsan, gellan, dextran, pullulan, curdlan, and derivatives thereof; (b) marine gums selected from the group consisting of algin, agar, carrageenan, and derivatives thereof; (c) plant exudates selected from the group consisting of locust bean, gum arabic, gum Karaya, tragacanth, Ghatti, and derivatives thereof; (d) seed gums selected from the group consisting of guar, locust bean, okra, *psyllium*, mesquite, and derivatives thereof; and (e) starch-based gums selected from the group consisting of ethers, esters, and derivatives thereof (f) associative thickeners selected from the group consisting of hydrophobically modified alkali swellable acrylic copolymer, hydrophobically modified urethane copolymer, associative thickeners based on polyurethanes, cellulose, polyacrylates, or polyethers.

In further exemplary methods and compositions of the invention, glycerin is present within the liquid additive in the amount of at least 5%, more preferably 20%, and most preferably 30%, based on total weight of the liquid-additive composition introduced to the carbonate particles being ground.

In still other preferred embodiments, the liquid additive composition is a clear liquid. For example, when potassium sorbate is employed as the fatty acid component, the liquid additive composition has a visually transparent orange color. The present inventors believe that clarity of the solution corresponds with an excellent ability of the liquid-additive composition to coat the carbonate particles quickly, thereby decreasing frictional coefficients of the particle surfaces and thus increasing efficiency of the particle grinding operation, as the coated surfaces more readily resist pack setting. In other words, the invention helps to reduce the energy that might be necessary to initiate flow of the powder in a given direction, which is important when unloading the particles from storage bins and moving the power during shipping or manufacturing operations.

In still further exemplary embodiments, the liquid additive composition comprises glycerin derived as a byproduct of biodiesel fuel production. In this regard, teachings of the use of crude glycerin obtained from biomass sources, as provided in U.S. Pat. Nos. 7,922,811 and 8,979,998 of Jardine et al., provide helpful instruction. Jardine et al. disclosed that crude glycerin obtained as byproduct from biodiesel production can lower the risk of sludging during cement grinding (using conventional cement grinding additive such as alkanolamines) when compared to glycerins obtained from fossil fuel sources. Jardine et al. employed smaller average weight molecules, compared to the larger polyglycerols (e.g., series of glycerol molecules) taught in U.S. Pat. No. 3,615,785 of Moorer et al. However, it should be noted that glycerin refined in the manner described above still needs to meet the criteria for a food-grade substance.

In further preferred exemplary methods and additive compositions of the present invention, the liquid additive composition comprises water in the amount of 5%-90% and more preferably 20%-60% based on total weight of the additive composition. The prevent inventors believe that a relatively large weight proportion of water can be used, for improved particle surface coating, without danger of overly moistening the resultant ground particles, due to the presence of the small chain fatty acids within the liquid additive composition.

In preferred exemplary methods and liquid additive compositions of the invention, the mass ratio of polyhydric alcohols (such as glycerin) to carboxylic acid compounds (including short chain fatty acid compounds such as potassium sorbate) in the liquid additive composition should not exceed 1.5. Otherwise, formulations may create a water-absorbing property in the resultant ground carbonate particles.

In still further exemplary embodiments which may be based upon any of the foregoing examples, the liquid additive grinding aid composition may preferably also comprise tripropylene glycol and/or polypropylene glycol. The polypropylene glycol preferably has a molecular weight in the range of from 300 to 3000 g/mole, and more preferably from 1200-3000 g/mole. These compounds also act as grinding aids that meet "food grade" or "food contact" requirements. The amount of tripropylene glycol and/or polypropylene glycol is suitably from 0.1 to 88 wt.-%, more preferably from 5 to 75 wt.-%, and most preferably from 10 to 60 wt.-%, based upon the weight of the grinding aid composition.

In still further exemplary embodiments which may be based upon any of the foregoing examples, the liquid additive grinding aid composition may preferably also comprise an alkanolamine; more preferably triethanolamine and/or triisopropanolamine. These compounds also act as grinding aids, and meet the "food grade" or "food contact" requirements. The amount of triethanolamine and/or triisopropanolamine is suitably from 0.1 to 70 wt.-%, more preferably from 5 to 60 wt.-% and most preferably from 10 to 50 wt.-%, based upon the weight of the grinding aid composition. For certain applications it may be desirable that the ground inorganic material does not comprise any amine, so in one embodiment of the invention, the grinding aid composition does not comprise an alkanolamine.

In still further exemplary embodiments which may be based upon any of the foregoing examples, the liquid additive grinding aid composition may preferably also comprise an amino acid or a salt of an amino acid, wherein the amino acid is preferably chosen from phenylalanine, isoleucine, tryptophan, leucine, valine, methionine, tyrosine, cysteine, alanine, threonine, histidine and glycine. These compounds also act as grinding aids, meet the "food grade" requirements and are not classified as VOCs. The amount of the amino acid or the salt of an amino acid is suitably from 0.1 to 10 wt.-%, more preferably from 1 to 5 wt.-% and most preferably from 3 to 4 wt.-%, based upon the weight of the grinding aid composition.

In still further exemplary embodiments which may be based upon any of the foregoing examples, the liquid additive grinding aid composition may preferably also comprise ascorbic acid or a salt of ascorbic acid. Suitable salts of ascorbic acid include salts of alkali metals and alkaline earth metals, e.g. monosodium ascorbate and calcium diascorbate. The terms "ascorbic acid" and "ascorbate" are used to cover all stereoisomers of ascorbic acid and ascorbate, i.e., it encompasses L-ascorbic acid, D-ascorbic acid, D-isoascorbic acid (also known as erythorbic acid) and L-isoascorbic acid, and the corresponding ascorbates. These compounds also act as grinding aids, meet the "food grade" requirements. The amount of the ascorbic acid or the salt of ascorbic acid is suitably from 0.1 to 24 wt.-%, more preferably from 2 to 15 wt.-% and most preferably from 5 to 10 wt.-%, based upon the weight of the grinding aid composition.

In still further exemplary embodiments which may be based upon any of the foregoing examples, the liquid additive grinding aid composition may preferably also comprise benzoic acid or a salt of benzoic acid. These compounds also act as grinding aids, meet the "food grade" requirements. The amount of benzoic acid or the salt of benzoic acid is suitably from 0.1 to 36 wt.-% of benzoic acid or a salt of benzoic acid, more preferably from 2 to 30 wt.-%, and even more preferably from 6 to 20 wt.-%.

In still further exemplary embodiments which may be based upon any of the foregoing examples, the liquid additive grinding aid composition may preferably also comprise a sugar alcohol, more preferably ribose. Ribose also acts as a grinding aid and meets "food grade" requirements.

The carbonate material which is ground into finer particle size may comprise carbonate which is calcined, non-calcined, or a mixture of these. Optionally, the carbonate material may also be ground with one or more additional organic materials, such as lime (e.g., hydrated lime), dolomite, talc, titanium dioxide, alumina, kaolin, ceramics, and cement clinker. For example, calcium carbonate in the form of limestone particles may be ground along with lime.

With respect to food-grade requirements, the present invention provides flexibility and can achieve results not provided by existing dry grinding processes and additives. For example, while U.S. Pat. No. 8,979,998 B2 describes an additive composition useful for dry-grinding of calcium carbonate that is comprised of glycerin, sodium acetate and water, this effective formulation may not be optimal for calcium carbonate that is intended to be applied in paints and plastics. In contrast, the liquid additives of the present invention, by employing glycerol in combination with small chain fatty acid (e.g., potassium sorbate) and water can be employed for these purposes.

Potassium sorbate is a short-chained unsaturated aliphatic compound having alkyl chain length of six carbons. The present inventors believe that liquid-additive formulations of the present invention improve the overall throughput of calcium carbonate mill grinding at a minimum dosage of 0.01% (100 ppm) based on dry material being ground, and that minimum dosage requirement for potassium sorbate as low as 0.001% may be potentially achieved. These throughput rates and dosage features are further discussed in the following examples involving dry-grinding of calcium carbonate.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention and comparative examples wherein the embodiments of the claimed invention are shown to obtain performance objectives not disclosed or suggested in the prior art. It should be understood, moreover, that the invention is not limited to the specific details set forth in the examples.

Example 1

An exemplary liquid-additive grinding additive composition can be formulated by mixing together the following components: potassium sorbate at 10%-60%, glycerin at 0-90%, and water at 5%-90% (all percentages based on total weight of liquid additive composition) using an overhead mixer (Model RZR50, Caframo of Georgian Bluffs Ontario, Canada) Canada) at speeds of at least 100 rpm and greater.

These components are readily mixed into stable solutions after approximately 10 minutes of mixing. The order of addition which is apparently most effective is as follows: first, into water is added the glycerin (Dow Chemical Company), and then potassium sorbate (Pfaltz & Bauer Inc., Waterbury, Conn.). The potassium sorbate, which is very soluble in water and soluble in glycerin, is slowly and gradually added to the mixture over a period of 1 minute.

Example 2

Another exemplary liquid grinding additive composition can be achieved in less than 10 minutes when mixing the following components at approximately 1500 rpm: potassium sorbate at 30%, glycerin at 30%, and water at 40% (all percentages based on total weight of liquid additive composition).

This mixture can also be prepared under slow mixing conditions (e.g., less than 100 rpm after 30 minutes).

Example 3

Preparation of Calcium Carbonate for Grinding

Approximately 6 kg of coarse calcium carbonate rocks up to 50 mm diameter are first preheated for a minimum of 12 hours at 130 degrees Celsius and then crushed using a jaw crusher (Model 2x6 from Sturtevant Inc., Hanover, Mass.) followed by a roll crusher (model 8x5, Sturtevant Inc., Hanover, Mass.) which reduces the particle size to an average maximum diameter of less than 2 mm. The mineral is then sieved into size fractions with the following average diameters: 0.841 mm, 0.595 mm, 0.250 mm, 0.149 mm, 0.074 mm, 0.044 mm and all particles having a diameter less than 0.044 mm. These fractions are further heated for a minimum of one hour at 130 degrees Celsius to drive off excess moisture. The now preheated calcium carbonate fractions are recombined make up 100 g of starting material with the original size distribution produced from pre-crushing. Each 100 g sample is mixed using an overhead mixer (Model RZR50, CAFRAMO, Warton, Ontario, Canada) at 300 rpm for 2 minutes.

The calcium carbonate is then dosed with a grinding aid composition made according to Example 4 at a dosage of 100 to 5000 ppm based on weight of calcium carbonate particles, using a micropipette. The content is then mixed further for an additional 3 minutes following administration of the grinding aid. The entire 100 g sample is used for each single batch grind described in the milling procedure.

Milling of Calcium Carbonate

The calcium carbonate particles are milled using a planetary ball mill system (Model: Pulverisette 5/4, Fritsch, Idar-Oberstein, Germany). 100 g of pretreated calcium carbonate is poured into a grinding bowl that is pre-loaded with 20 stainless steel balls (½" diameter), which is then clamped into the mill equipment. The planetary ball mill machine is then turned on for 10 to 90 minutes at 100-300 rpm. (It is believed that dry-milling of calcium carbonate particles is not limited to planetary ball mill systems, as the overall method is quite applicable to full-scale ball mills and roller mills including open and closed circuit design systems).

Characterization of Milled Calcium Carbonate

The contents of the grinding bowl is sieved using a relatively large mesh (>1 mm) to separate the grinding media from the finished particles. The finished product is then mixed using an overhead mixer for 2 minutes, and evaluated based on the following factors: (A) surface area testing using Blaine air permeability apparatus in accordance with ASTM C204 (1999); (B) size distribution testing in terms of percentage of residual particles remaining on the 45 um sieve using Model Air Jet Sieve, from Hosokawa ALPINE, Augsburg, Germany; (C) flowability testing in terms of modified pack set testing in accordance with ASTM C1565 (2011); and (D) water absorption (It is noted that ASTM C1565 calls for a particular apparatus to be used in the testing procedure wherein 50 g of powder is vibrated at a setting of 60 V for 3 minutes; the 250 mL Erlenmeyer flask is then left at rest for 1 minute and then placed on a Roto-Tester to determine the pack set according to ASTM procedure). The water absorption was evaluated using a GINTRONIC GraviTest unit. This measured the difference in moisture absorbed at a relative humidity of 10% and a relative humidity of 85%.

Grinding Aid Performance Assessment

Sample A and Sample B are compared with: water (Sample Water), monopropylene glycol (Sample MPG) used as an example of a well-known grinding additive used in the manufacturing industry, and prior art (Sample "PA"). Sample PA contains sodium acetate and 50% by weight of a glycerol and may encourage humectant behavior. Grinding ball mill speed was 150 rpm, and grinding took place for 30 minutes.

TABLE 3

| Component (ppm) | Sample Water | Sample MPG | Sample PA | Sample A | Sample B |
|---|---|---|---|---|---|
| Water | 520 | 520 | 497 | 520 | 520 |
| Glycerol | — | — | 624 | 390 | — |
| Monopropylene Glycol | — | 780 | — | — | — |
| Sodium Acetate | — | — | 179 | — | — |
| Potassium Sorbate | — | — | — | 390 | 390 |

Example 4

The ability of grinding additive compositions containing potassium sorbate to produce finely ground limestone particles with improved surface area, size distribution, and bulk flow were compared against a blank condition (Sample Water), monopropylene glycol (Sample MPG), the industry standard, and prior art (Sample PA), as shown in Table 4 below. It should be noted that the measurement errors listed were based on the standard deviation on measurements reported from two separate grinds per experimental condition.

TABLE 4

| Formulation | Surface Area (m²/kg) |
|---|---|
| Sample Water | 357 +/– 0 |
| Sample MPG | 411 +/– 0 |
| Sample PA | 434 +/– 1 |
| Sample A | 436 +/– 1 |
| Sample B | 407 +/– 1 |

As shown in Table 4, both Sample A and Sample B liquid grinding additive formulations achieved respectable performance that was either similar or outperformed MPG in grinding carbonate into finer particle sizes under the conditions outlined above. Sample A produced calcium carbonate particle surface areas that are comparable to Sample PA which employed sodium acetate (prior art) grinding additive. Sample B provided higher particle surface area, compared to water, demonstrating that potassium sorbate is highly effective as a grinding aid when used in dosages of at least 10% by wt. or more.

The particle sizes obtained from use of the respective grinding additive samples are also examined with respect to residual particles left on a 45-micron screen, and the results are shown in Table 5 below:

TABLE 5

| Formulation | 45 Micron Residue (%) |
|---|---|
| Sample Water | 25.7 +/– 0.3 |
| Sample MPG | 5.7 +/– 0.6 |
| Sample PA | 8.2 +/– 0.3 |
| Sample A | 6.9 +/– 0.2 |
| Sample B | 10.4 +/– 0.1 |

As seen in Table 5, both Sample A and Sample B formulations serve as grinding aids under the conditions outlined. The residue produced from grinding carbonate using Sample A is comparable to Sample MPG, the industry standard, and similarly Sample B delivered considerably lower particle residue compared to the particles ground using Sample Water, demonstrating again that a potassium sorbate solution is an effective standalone grinding aid.

Next, the anti-humectant behavior of the sample liquid grinding additives are tested with respect to their ability to resist pack-setting of the powder composition after grinding and water absorption. The results are summarized in Table 6 below.

TABLE 6

| Formulation | Packset Index |
|---|---|
| Sample Water | 9.8 +/– 0 |
| Sample MPG | 9.1 +/– 0.1 |
| Sample PA | 18.4 +/– 0.3 |
| Sample A | 11.9 +/– 0.4 |
| Sample B | 9.3 +/– 0.1 |

Table 6 provides insight into the humectant behavior exhibited by Sample PA. The pack set test, used for demonstrating flowability of calcium carbonate particles after grinding, is dependent on the physical conditions (temperature, humidity, extent of vibration) and surface area of the powder material. In this case, Sample PA appears to encourage a higher level of moisture absorption than the candidate formulations, and thus the high pack set index numbers suggest poor flowability of the powder.

Fortunately, Sample A does not appear to produce the same potentially detrimental results to the calcium carbonate, and is more comparable to the industry standard Sample MPG.

TABLE 7

| Formulation | Water absorption (mg/g) |
|---|---|
| Sample MPG | 1.64 |
| Sample PA | 2.98 |
| Sample A | 1.64 |

Table 7 demonstrates the ability of the invention (Sample A) to deliver comparable anti-humectant properties as the industry standard (Sample MPG) and significantly better than the prior art (Sample PA). However, unlike the current industry standard, Sample A is a VOC-free formulation. It should also be noted that results shown above were from formulations that were prepared in the same ratios explained in table 3, but supplied an elevated total dosage (1500 ppm) on the mineral to be ground.

Example 5

This example distinguishes the function of potassium sorbate. More specifically, it illustrates the differences in surface area and size distribution of ground limestone particles when the compound is incorporated in compositions at levels adequate for food preservation, as opposed to the minimum amounts taught by the present inventors for production of finely ground calcium carbonate particles.

Here the present inventors surprisingly discovered that using potassium sorbate in liquid grinding additive compositions in even amounts up to 5% by total weight (which is well beyond the percentage amount previously taught as suitable for anti-microbial and food preservative applications) did not achieve significant enhancement of dry particle grinding efficiency.

The results showing 1% and 5% addition of potassium sorbate compared to the surprising results obtained at the higher percentage rates taught by the present inventors are summarized below in Table 8 and Table 9.

TABLE 8

| Formulation | Surface Area (m²/kg) | % Change in Surface Area/% Increase in Dosage |
|---|---|---|
| 1000 ppm Water | 364 +/- 0 | |
| 1010 ppm 1 wt.-% Potassium Sorbate | 375 +/- 1 | N/A |
| 1053 ppm 5 wt.-% Potassium Sorbate | 388 +/- 1 | 0.01 |
| 1111 ppm 10 wt.-% Potassium Sorbate | 413 +/- 0 | 0.06 |
| 1250 ppm 20 wt.-% Potassium Sorbate | 413 +/- 0 | 0 |
| 1333 ppm 25 wt.-% Potassium Sorbate | 415 +/- 0 | 0.01 |
| 1429 ppm 30 wt.-% Potassium Sorbate | 415 +/- 0 | 0 |

TABLE 9

| Formulation | 45 Micron Residue (%) | % Change in Residue/% Increase in Dosage |
|---|---|---|
| 1000 ppm Water | 23.7 +/- 0 | |
| 1010 ppm 1 wt.-% Potassium Sorbate | 22.7 +/- 0 | N/A |
| 1053 ppm 5 wt.-% Potassium Sorbate | 17.9 +/- 0 | 0.05 |
| 1111 ppm 10 wt.-% Potassium Sorbate | 15.5 +/- 0 | 0.12 |
| 1250 ppm 20 wt.-% Potassium Sorbate | 12.2 +/- 0 | 0.17 |
| 1333 ppm 25 wt.-% Potassium Sorbate | 11.9 +/- 0 | 0.07 |
| 1429 ppm 30 wt.-% Potassium Sorbate | 8.9 +/- 0 | 0.87 |

Table 8 and Table 9 demonstrate that at concentrations within the conventional percentages corresponding to antimicrobial applications (1%) and even in excess of this conventional dosage amount (5%), the particle residue produced from grinding calcium carbonate does not really differ from that of water. In both cases, the increase in dosage from 5 wt.-% to 10 wt.-% results in a surprising increase in the grinding efficiency of the process. Moreover, at elevated levels of potassium sorbate, such as at the preferred 30% amount (by weight based no liquid additive composition), the potassium sorbate performs comparably to the conventional grinding aids as summarized above in Table 5.

In summary, a stable and high-solid content liquid grinding additive composition containing high levels of potassium sorbate, glycerin, and water provides grinding efficiency for carbonates, and it is believed this will also be achieved for other inorganic particles as well, including lime, cement, and other inorganic materials. The use of small chain fatty acids, such as potassium sorbate, sodium sorbate, calcium sorbate, or mixtures of these, can provide food-grade, anti-humectant properties (e.g., lower moisture absorption tendency in the resultant product), and can help manufacturers of ground carbonate (limestone) particles to a broader client base.

The foregoing example and embodiments were present for illustrative purposes only and not intended to limit the scope of the invention.

It is claimed:

1. A method for comminuting inorganic material to a finer particle size, comprising:
grinding a carbonate material into powder particles, in a ball or roller mill, into which is introduced a liquid-additive composition comprising (a) potassium sorbate fatty acid compound in the amount of 10%-60% by total weight; (b) a glycerin in the amount of 0%-50% by total weight; and (c) water in the amount of 5%-90%, all percentages being based on total weight of the liquid-additive composition introduced to the carbonate powder particles being ground;
wherein, as the glycerin is present in the amount of 0%-50% in the liquid-additive composition introduced into the carbonate grinding, the mass ratio of glycerin and other polyhydric alcohols within the liquid-additive composition to potassium sorbate fatty acid compound within the liquid-additive composition does not exceed 1.5, the liquid-additive composition effective thereby to coat the surface of carbonate particles being ground without creating a water-absorbing property in the resultant ground carbonate particles.

2. The method of claim 1 wherein the liquid-additive composition further comprises a fatty acid compound chosen from sodium sorbate and calcium sorbate or a mixture thereof.

3. The method of claim 2 wherein the liquid additive composition further comprises calcium sorbate.

4. The method of claim 1 wherein the liquid additive composition further comprises sodium sorbate.

5. The method of claim 1 wherein glycerin is present in an amount of at least 5% by weight based on total weight of the liquid-additive composition being introduced to the carbonate material being ground.

6. The method of claim 1 wherein the liquid additive composition comprises potassium sorbate in the amount of at least 20% by total weight of the liquid-additive composition.

7. The method of claim 1 wherein the liquid-additive composition comprises potassium sorbate in the amount of at least 30% by total weight of the liquid-additive composition.

8. The method of claim 1 wherein the liquid-additive composition comprises glycerin derived as a byproduct of biodiesel fuel production.

9. The method of claim 1 wherein the liquid-additive composition comprises water in the amount of 20%-60% by total weight of the liquid-additive composition.

10. The method of claim 1 wherein, in addition to the carbonate material, the grinding further includes an inorganic material chosen from lime, dolomite, talc, titanium dioxide, alumina, kaolin, ceramics, and cement clinker.

11. The method of claim 10 wherein the additional inorganic material being ground with the carbonate material is lime.

12. The method of claim 1 wherein the liquid-additive composition further comprises tripropylene glycol, polypropylene glycol, or both.

13. A method for comminuting inorganic material to a finer particle size, comprising:
grinding a carbonate material into powder particles, in a ball or roller mill, into which is introduced a liquid-additive composition comprising (a) a fatty acid compound in the amount of 20%-60% by weight, the fatty acid compound being represented by the structural formula $CH_3-(CH)_n-COO^-M^+$ wherein M represents an alkali or alkaline earth metal selected from the group consisting of potassium, sodium, and calcium, and n represents an integer of 3 from 4 to 10; (b) a glycerin in the amount of 20%-50% by total weight; and (c) water in the amount of 20%-60% by total weight, all percentages being based on total weight of the liquid-additive composition introduced to the carbonate powder particles being ground;
wherein, as the glycerin is present in the amount of 20%-50% in the liquid-additive composition introduced into the carbonate grinding, the mass ratio of glycerin and other polyhydric alcohols within the liquid-additive composition to potassium sorbate fatty acid compound within the liquid-additive composition does not exceed 1.5, the liquid-additive composition effective thereby to coat the surface of carbonate particles being ground without creating a water-absorbing property in the resultant ground carbonate particles.

14. The method of claim 13 wherein the liquid-additive composition further comprises tripropylene glycol, polypropylene glycol, or both.

* * * * *